Jan. 27, 1970     T. R. STOCKTON     3,491,865
CLUTCH STRUCTURE WITH SEGMENTED CLUTCH PLATES
Filed Feb. 23, 1968     3 Sheets-Sheet 1

INVENTOR:
THOMAS R. STOCKTON
BY
ATTORNEYS.

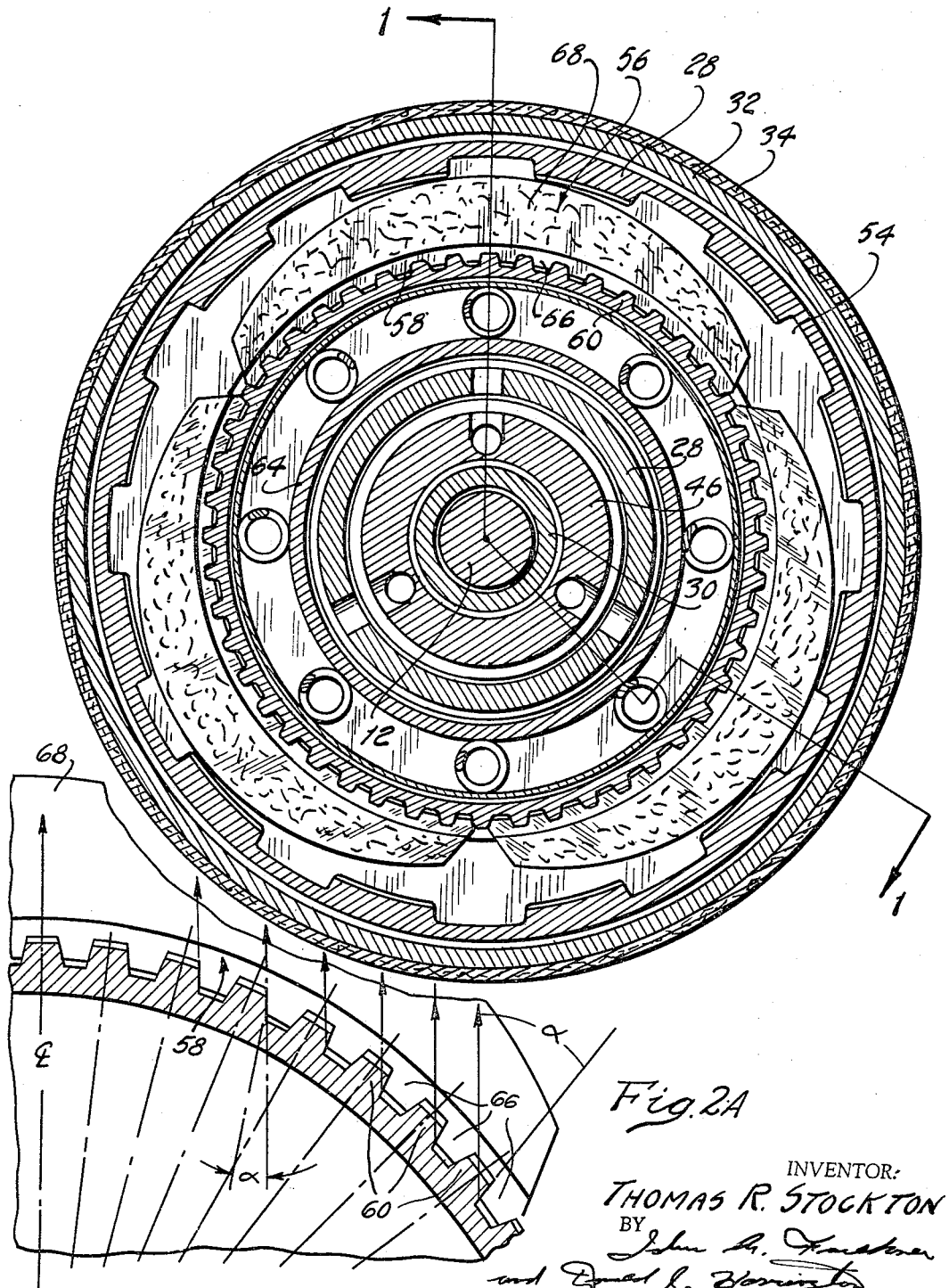

Jan. 27, 1970  T. R. STOCKTON  3,491,865
CLUTCH STRUCTURE WITH SEGMENTED CLUTCH PLATES
Filed Feb. 23, 1968  3 Sheets-Sheet 3
Fig. 3-A
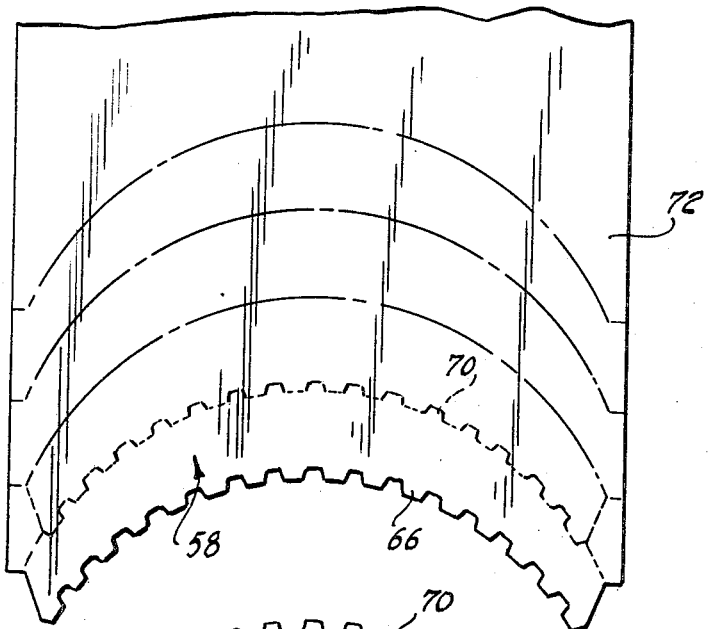
Fig. 3-B
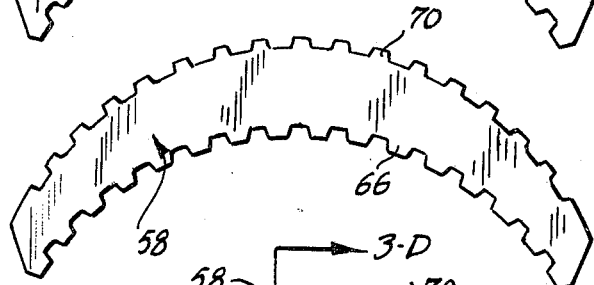
Fig. 3-C
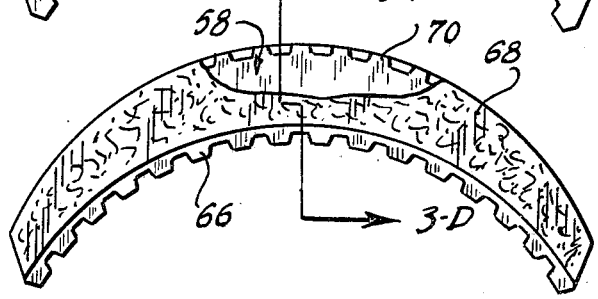
Fig. 3-D
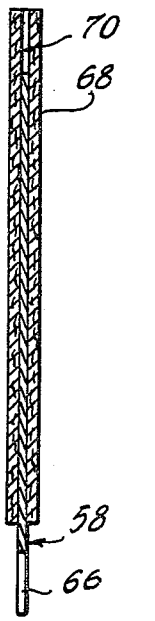
INVENTOR:
THOMAS R. STOCKTON
BY
ATTORNEYS.

United States Patent Office 3,491,865
Patented Jan. 27, 1970

3,491,865
CLUTCH STRUCTURE WITH SEGMENTED CLUTCH PLATES
Thomas R. Stockton, Ann Arbor, Mich., assignor to Ford Motor Company, Dearborn, Mich., a corporation of Delaware
Filed Feb. 23, 1968, Ser. No. 707,662
Int. Cl. F16d *13/52, 13/64*
U.S. Cl. 192—70.14                6 Claims

ABSTRACT OF THE DISCLOSURE

A clutch disc assembly comprising one or more clutch valve assembly (disregarding the force due to the weight disc clutch assembly and one or more clutch disc separator plates carried by another torque delivery element wherein the plates are situated in stacked relationship and wherein the clutch plates are formed in multiple segments which are freely splined to the one torque delivery element.

BRIEF DESCRIPTION OF THE INVENTION

The invention comprises an improvement in a multiple disc clutch assembly that is adapted especially to be used in torque delivery gear systems in an automotive vehicle driveline. Friction clutch plates in my improvement are connected to an externally-splined clutch hub. These plates are formed as a crescent, and each plate registers with the hub spline teeth over an arc extending approximately 120° along the pitch circle of the spline. Although three clutch plates for each set of clutch plates is preferred, other numbers of clutch plates might be used in each set. In the latter case the arc over which the clutch plates extend would be different than 120°.

The other torque delivery member of the clutch structure comprises an internally splined clutch drum which carries externally splined clutch separator plates. These register with the friction clutch plates. The separator plates may be of conventional form.

The clutch element that carries the separator plates defines an annular cylinder within which is positioned an annular piston. Fluid pressure can be admitted in the usual fashion to the annular cavity defined by the cylinder and the piston thereby causing the clutch plates and the separator plates to become frictionally engaged to establish a driving connection between the clutch elements.

Unlike prior art multiple disc clutch assemblies, the clutch plates of my invention have a reduced tendency to warp due to a heat build-up during clutch engagement. If the clutch plates were formed with as a conventional annulus the build-up in heat during clutch engagement would produce a tendency to warp and cause a Belleville effect. The inside diameter of the clutch plates in such conventional mechanisms becomes displaced with respect to the outside periphery and clutch engagement then becomes erratic.

The clutch plates of my invention have a free-floating characteristic. They may be formed by a simple stamping operation with little or no waste material in the clutch plates steel stock.

The finished clutch plates form a crescent. Friction material is bonded to the sides of the plates. The free floating movement of the plates results in flatness of the plates during clutch engagement.

BRIEF DESCRIPTION OF THE FIGURES OF THE DRAWINGS

FIGURE 2 shows a cross sectional view of the clutch plate sub-assembly for the multiple disc clutch structure shown in FIGURE 1. FIGURE 2 is taken along the plane of section line 2—2 of FIGURE 1;

FIGURE 2A shows the relationship between the side angles on the spline teeth of FIGURE 2; and FIGURES 3A through 3D show how the segmented clutch plates are formed from steel stock.

PARTICULAR DESCRIPTION OF THE INVENTION

Figure 1:
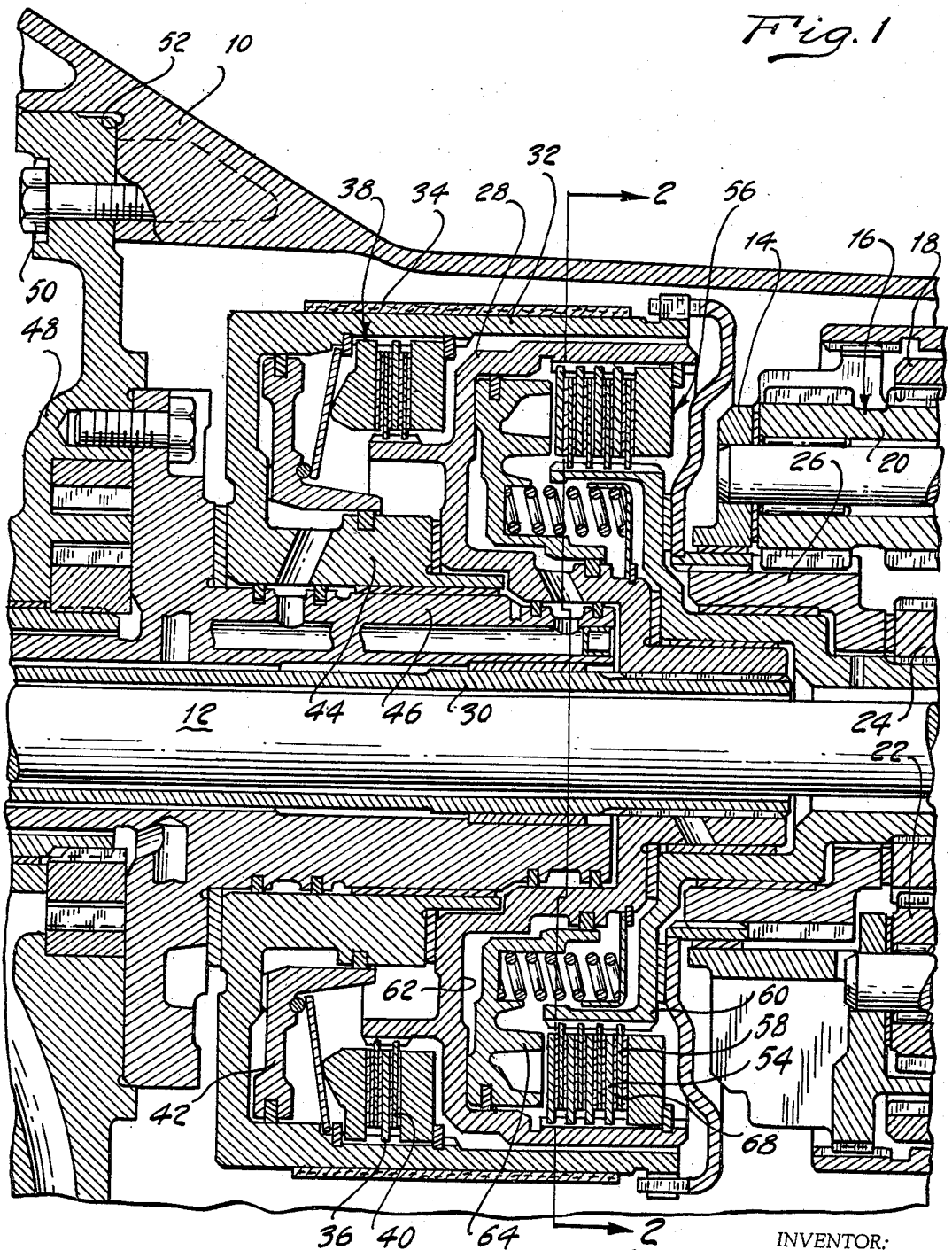
FIGURE 1 shows a clutch disc assembly in a geared, multiple-ratio, power transmission mechanism. Either one or both of the two clutch structures shown in FIGURE 1 may employ the improvements of my invention.

In FIGURE 1 numeral 10 designates a transmission housing which may be bolted or otherwise secured to the engine block of an internal combustion engine in an automotive vehicle driveline. Numeral 12 is a power input shaft. Shaft 12 is connected to the crankshaft of the internal combustion engine.

It is connected also through a selectively engageable friction clutch, not shown, to the carrier 14 of a compound planetary gear unit 16.

Unit 16 includes a ring gear 18 which can be connected to the power output shaft, not shown. It includes also a set of long planet pinions 20 rotatably supported by the carrier 14, and a set of short planet pinions 22 also supported by the carrier 18. Pinions 22 engage sun gear 24 and the pinions 20. Pinions 20 engage also a second sun gear 26 as well as a ring gear 18.

Clutch drum 28 is splined to power input sleeve shaft 30. This shaft can be connected to the turbine of a hydrokinetic torque converter, the impeller of which is connected to the crankshaft of the engine. Surrounding the drum 28 is a brake drum 32, which is connected to the sun gear 26. A friction brake band 34 surrounds the drum 32. It may be applied and released by a brake servo in the usual fashion to selectively anchor the sun gear 26.

Brake drum 32 carries an internally splined clutch disc separator plate 36 for a multiple disc clutch assembly 38. Clutch plates 40 are carried by the clutch drum 28. These plates 40 are adapted to engage frictionally the separator plate 36 as pressure is admitted behind an annular piston 42 for the clutch servo.

The drum 32 includes a hub 44, which is rotatably journaled on a bearing fork sleeve 46. This is connected to a transverse wall 48, which is bolted by bolts 50 to an internal shoulder 52 formed in the housing 10. The clutch drum 28 carries clutch disc separator plates 54 which form a part of a multiple disc clutch assembly 56. The assembly includes also clutch discs 58 which are formed with internal splines to register with externally splined clutch teeth formed on clutch element 60. Clutch element 60 in turn is connected directly to the sun gear 24.

Clutch drum 28 defines an annular cylinder 62, which receives an annular piston 64. When fluid pressure is admitted to the chamber defined in part by the piston 64, the clutch disc separator plates 54 are frictionally engaged with clutch discs 58 thereby establishing a driving connection between the shaft 30 and sun gear 24.

During low speed ratio operation the carrier 14 is anchored by a low speed ratio brake, not shown. The clutch assembly 56 is applied thereby causing input torque to be delivered from the shaft 30 to the sun gear 24.

During intermediate speed ratio operation clutch 56 remains applied, but the brake 34 is anchored thereby anchoring sun gear 26. Sun gear 26 thus acts as a reaction member for the gear system and the ring gear 18 is driven at an intermediate speed ratio.

High speed ratio operation is achieved by engaging simultaneously clutch 56 and a selectively engageable high speed ratio clutch, not shown, which connects directly the shaft 12 to the carrier 14. Overdrive is accomplished by engaging simultaneously the brake 34 and the clutch structure which connects shaft 12 to the carrier 14.

It is apparent from the foregoing description that the clutch 56 is engaged and released selectively depending upon whether high speed ratio operation or overdrive operation is desired. It must be engaged under torque, and it must be capable of accommodating a limited degree of relative slipping between the friction discs and the separator plates.

FIGURE 3A shows the cresent shape of the segmented clutch plates. Each plate includes a splined inner periphery 66. They are formed from strip steel stock which is represented by phantom lines 72. The plates are stamped from the strip steel stock with a die on which the spline teeth are formed. This produces, of course, segmented clutch plates having spline teeth on both the outer periphery and the inner periphery as shown in FIGURE 3B. After the stamped, segmented clutch plates are formed, the faces of the clutch plates have bonded thereto a friction lining 68 as shown in FIGURES 3C and 3D which covers the teeth 70 on the outer periphery of the plate. This produces additional frictional area.

In the embodiment shown in FIGURE 2, the segmented clutch plates are shown. The spline teeth can be formed with straight side angles thereby producing a so called "keystone" effect that locks the clutch plates against displacement in a radial direction upon rotation of the clutch element 60 to which they are connected.

The angle formed by the spline sides and the vertical reference line increases as the distance between the center line of the clutch discs and the vertical line increases. The angle α shown in FIGURE 2A is greater at the extreme right-hand side of the view than at the center of the view.

A locking action will occur whenever the angle $a$ is greater than zero. This is due to the interference that exists between the operating teeth of the clutch hub and the individual teeth of the clutch plates.

The improved clutch structure of my invention is adapted especially for use in large diameter clutch disc assemblies where the clutch plates are located on a relatively large operating radius. In such applications the savings in the stock is a maximum. In contrast, the percentage of stock waste obtained during stamping operations for conventional, annular clutch plates increases as the diameter of the clutch plates increases. The percentage of waste of strip stock during the stamping operation of my improved clutch plates, however, remains a minimum regardless of the diameter of the clutch structure.

A high degree of flatness is achieved during clutch engagement because of the reduced tendency of the clutch plates to warp as heat builds-up.

Having described a preferred form of my invention, what I claim and desire to secure by U.S. Letters Patent is:

1. A multiple disc clutch assembly comprising a torque input clutch element, a torque output clutch element, internal splines formed on said input clutch element, external splines formed on said output clutch element, an annular clutch disc separator plate secured to said input clutch element, segmented clutch plates secured to said output clutch element, said clutch plates having an arcuate inner periphery formed with internal spline teeth, the external spline teeth of said output clutch element registering with the internal spline teeth of said clutch plates, said separator plate being adapted to register with a plurality of clutch plates, and servo means for applying clutch engaging pressure to said clutch assembly whereby said clutch disc separator plate frictionally engages said segmented clutch plates, said clutch plates being formed with external clutch teeth on the outer periphery thereof, friction material formed on the sides of said clutch plates, said external teeth being formed during formation of the clutch plates by a stamping die as it cuts the clutch plate material from a strip of steel plate stock, the radius of curvature of the outer periphery of each plate being equal to the radius of curvature of its inner periphery.

2. The combination as set forth in claim 1 wherein said clutch plates are three in number, each clutch plate extending through an arc of about 120° along the pitch circle for the teeth of said clutch hub.

3. In a multiple disc clutch assembly, an externally splined clutch hub, a plurality of internally-splined, segmented clutch plates, friction material formed on each of the two opposed faces of each clutch plate, each segmented clutch plate registering with the external splines of said clutch hub, said clutch plates extending along an arc, the spline teeth side angles on the teeth of the clutch hub spline and the registering clutch plate splines being generally radial thereby establishing a locking action between the individual clutch plates and the clutch hub which prevents radial displacement of the clutch plates with respect to the hub during rotation of the hub, said clutch plates being formed with external clutch teeth on the outer periphery thereof, said external teeth being formed during formation of the plates by a stamping die as it cuts the clutch plate material from a strip of steel plate stock, the radius of curvature of the outer periphery of each plate being equal to the radius of curvature of its inner periphery.

4. The combination as set forth in claim 3 wherein said clutch plates are three in number, each clutch plate extending through an arc of about 120° along the pitch circle for the teeth of said clutch hub.

5. A multiple disc clutch assembly comprising a torque input clutch element, a torque output clutch element, internal splines formed in said input clutch element, a clutch disc separator plate secured to said input clutch element, segmented clutch plates secured to said output clutch element, said clutch plates having an arcuate inner periphery formed with internal spline teeth, the external spline teeth of said output clutch element registering with the internal spline teeth of said clutch plates, said separator plate being adapted to register with a plurality of clutch plates, and servo means for applying a clutch engaging pressure to said clutch assembly whereby said clutch disc separator plate frictionally engages said crescent clutch plates, said clutch plates being formed with external clutch teeth on the outer periphery thereof, frictional material formed on the sides of said clutch plates, the radius of curvature of the outer periphery of each plate being equal to the radius of curvature of its inner periphery.

6. The combination as set forth in claim 5 wherein said clutch plates are three in number, each clutch plate extending through an arc of about 120° along the pitch circle for the teeth of said clutch hub.

References Cited

UNITED STATES PATENTS

| | | | |
|---|---|---|---|
| 1,660,497 | 2/1928 | Treiber | 192—70.2 XR |
| 2,108,059 | 2/1938 | Glasner | 192—107 XR |
| 2,330,856 | 10/1943 | Adamson | 192—70.14 |
| 3,105,575 | 10/1963 | Dewar et al. | |
| 3,412,836 | 11/1968 | Wilmer | 192—107 |

MARK M. NEWMAN, Primary Examiner

A. D. HERRMANN, Assistant Examiner

U.S. Cl. X.R.

192—70.2, 107